May 6, 1952     A. H. CASTELOW     2,595,638
MACHINE FOR SEPARATING MEMBRANES OF ANIMAL INTESTINES
Filed March 22, 1948     4 Sheets-Sheet 1
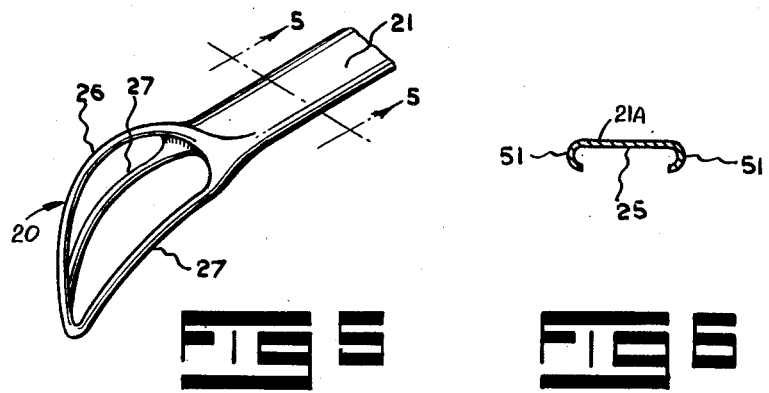
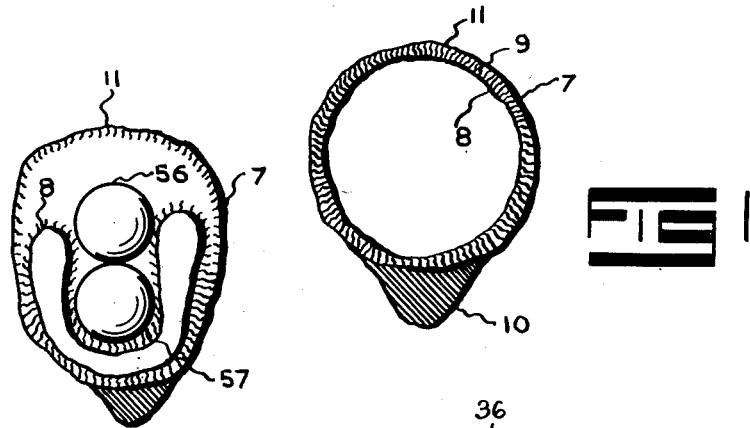
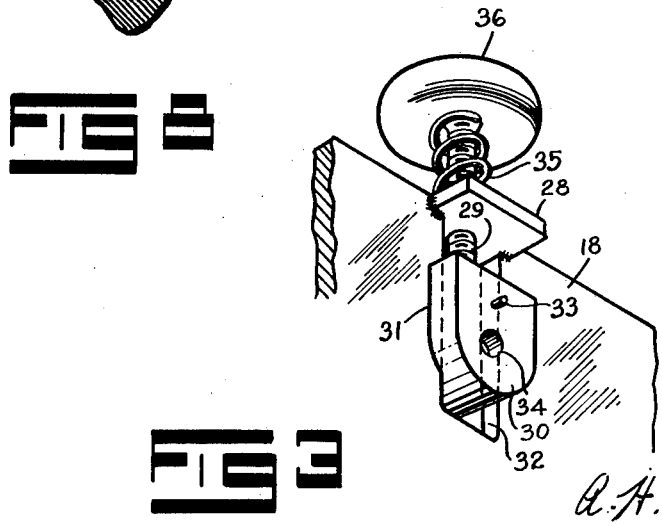
Inventor:
A. H. Castelow May 6, 1952 A. H. CASTELOW 2,595,638
MACHINE FOR SEPARATING MEMBRANES OF ANIMAL INTESTINES
Filed March 22, 1948 4 Sheets-Sheet 2
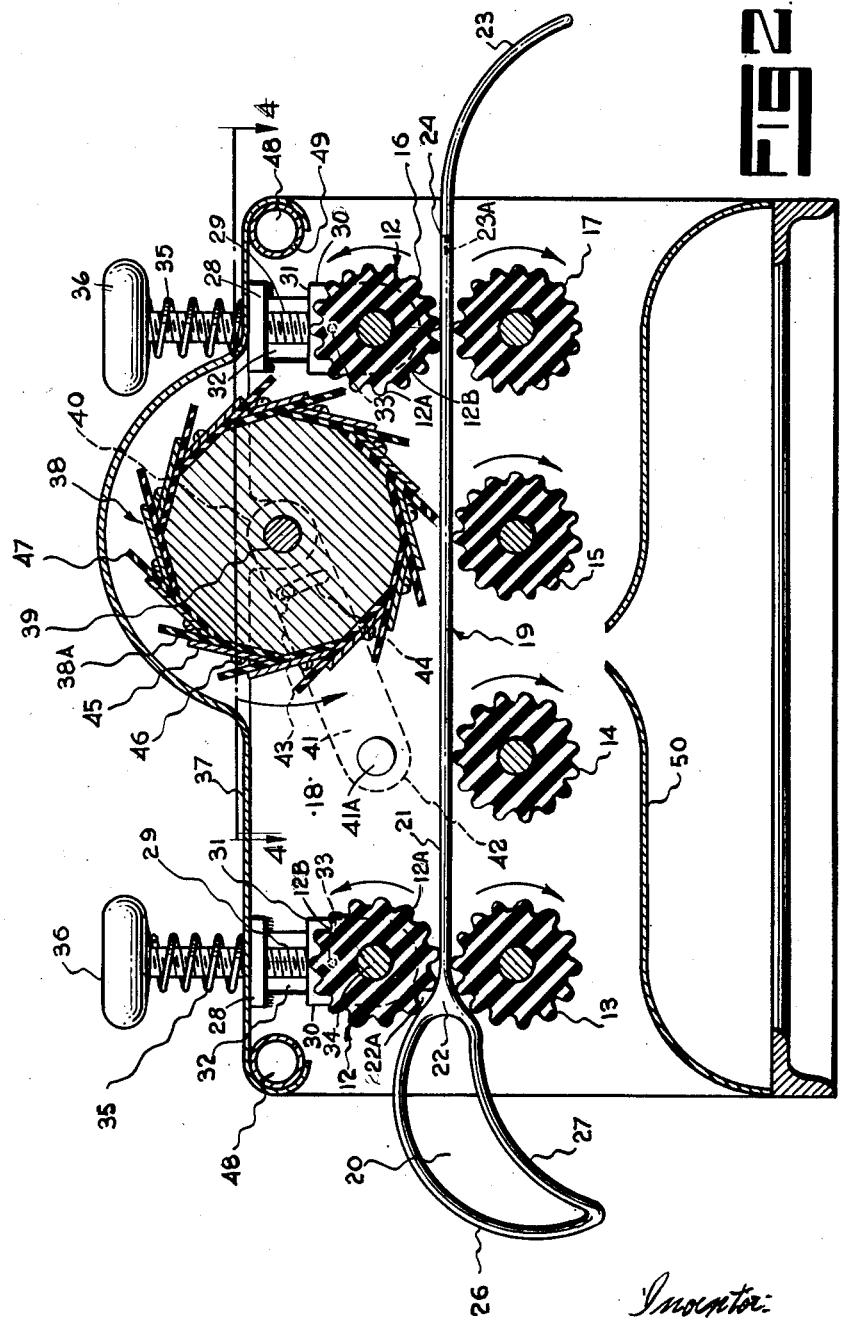

May 6, 1952     A. H. CASTELOW     2,595,638
MACHINE FOR SEPARATING MEMBRANES OF ANIMAL INTESTINES
Filed March 22, 1948     4 Sheets-Sheet 3

INVENTOR
ALFRED HAROLD CASTELOW,
BY *Wenderoth, Lind & Ponack*
ATTORNEYS

May 6, 1952 A. H. CASTELOW 2,595,638
MACHINE FOR SEPARATING MEMBRANES OF ANIMAL INTESTINES
Filed March 22, 1948 4 Sheets-Sheet 4

Patented May 6, 1952

2,595,638

UNITED STATES PATENT OFFICE 2,595,638

MACHINE FOR SEPARATING MEMBRANES OF ANIMAL INTESTINES

Alfred Harold Castelow, Hurstville, near Sydney, New South Wales, Australia

Application March 22, 1948, Serial No. 16,376
In Australia February 3, 1947

7 Claims. (Cl. 17—43)

This invention relates to the treatment and manipulation of animal intestines, particularly beef intestines, for the purpose of separating the two membranes thereof and providing improved "gut" for use in the manufacture of tennis racquet strings and the like, and improved casings for filling with sausage meat, or for other purposes.

At present it is the usual practice to use the best part of the length of the "runner" or intestine in the manufacture of sausage casings, and an inferior part of the length in the manufacture of gut.

The reason for this is that existing methods of separating the inner membrane from the outer one which is used in gut manufacture, involve the splitting or cutting of both membranes or perforation of the inner one.

The splitting of the outer membrane is unimportant but splitting or perforating the inner membrane renders it useless as a sausage casing.

On the other hand, casings made with the outer as well as the inner membrane intact have the major disadvantage that the outer membrane is not only superfluous, since the inner membrane is sufficiently strong to retain the sausage meat, but is also so tough as to make cutting thereof difficult.

The principal object of the present invention therefore is to provide a method of and means for facilitating the separation of the inner membrane from the outer one without damaging the inner one.

Another object is to provide a method of and means for separating the membranes and splitting the outer one but not the inner one, so that a greatly improved sausage casing and improved material for the manufacture of gut are simultaneously provided.

The invention therefore, in one form, is a method of treating a runner including the step of rupturing by roller means, for at least part of the circumference of the runner, the fibrous tissue connecting the inner and outer membranes.

In another form the invention is a machine for carrying out the above method, the machine comprising a carrier bar adapted to receive thereon a runner with the bar located within the inner membrane, means for supporting the bar in a substantially fixed position, means for feeding the runner along the bar and roller means for rupturing the connecting fibres by crushing the runner between said rupturing means and said carrier bar.

The means for carrying out the method of treatment according to the invention, will now be described with reference to the drawings in which:

Fig. 1 is a diagrammatic transverse section, approximately full size, of a typical beef intestine or runner;

Fig. 2 is a longitudinal sectional elevation of the machine for rupturing the fibres between the membranes;

Fig. 3 is a perspective view of means provided for varying the pressure between each upper end roller and a carrier bar located between the rollers of each pair of end rollers of the machine of Fig. 2;

Fig. 5 is a perspective view of the entry end of the carrier bar;

Fig. 6 is a section on the line 5—5 of Fig. 4;

Fig. 8 is a diagrammatic transverse section of a runner with balls forming part of the separating means located between the membranes.

Figure 4:
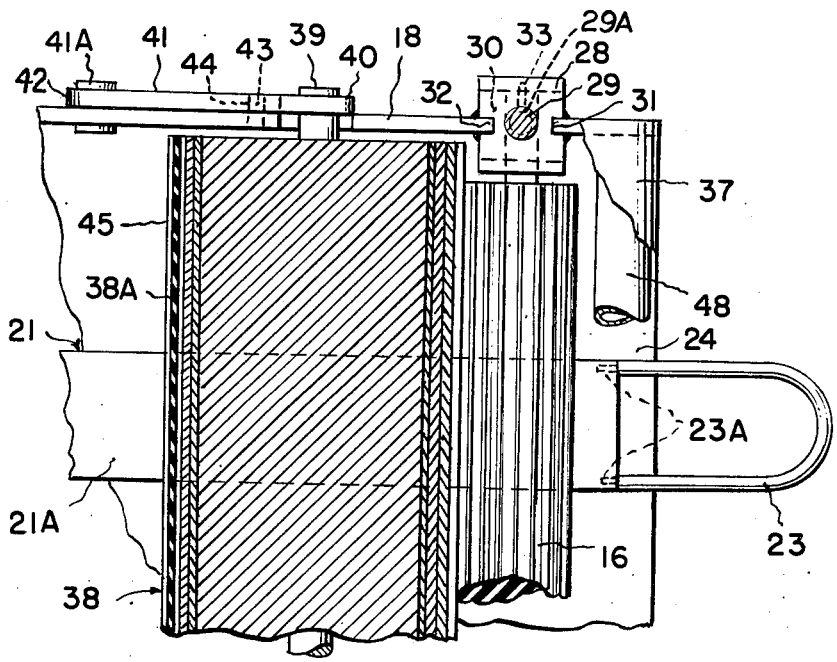
Fig. 4 is a sectional view taken on the line 4—4 of Fig. 2 parts thereof being broken away for clarity.

A typical runner has an outer membrane 7 and an inner membrane 8 joined by fibrous tissue 9. A thick layer of fat 10 is attached to the outside of the outer membrane and a thin layer extends around the outer membrane, the layer usually ending about ½" to ⅝" on either side of a point 11 approximately diametrally opposite the layer 10. The portion of the outer membrane near the point 11 is the strongest and is the one used for the manufacture of gut.

The part of the two membranes adjacent to the fat 10 is the weakest. In one process of crushing the runner to rupture the fibrous tissue 9, as a preliminary to separating the membranes and cutting the outer one adjacent to the point 11, the outer membrane may be ruptured adjacent to the fat 10. If it is not ruptured it may be so weakened that it is ruptured during subsequent treatment.

To prevent this rupture of the outer membrane, means are incorporated in the machine shown in Fig. 2, for protecting the fatty part of the runner while it is passing through the machine.

The machine will be described and claimed in its normal operating position, that is with the carrier bar and the roller axes approximately horizontal.

Referring to Fig. 2, rollers 12, 13, 14, 15, 16 and 17 are rotatably mounted between side plates, for example 18, of the machine. The axes of the rollers are parallel to each other and perpendicular to the side plates. The rollers are constructed of resilient material, for example rubber, and are corrugated by being fluted longitudinally, leaving ridges 12A between the flutes 12B.

A narrow flat carrier bar 19 is located between the entry and rollers 12 and 13 and the exit end rollers 16 and 17 and above and closely adjacent to the rollers 14 and 15. The bar is preferably made in two parts. The longer part comprises a cage 20 and a part 21 joined by a thickened part 22. The shorter part 23 is detachably secured to the longer part at the point 24 at the exit end of the machine.

The part 21 has a channel 25 (see Fig. 6) formed on its underside within which the fatty part 10 of the runner is located during its passage through the machine. The channel extends from adjacent to the point 24 to and through the part 22.

The cage (see Fig. 5) comprises a curved rod 26 in the medial longitudinal plane of the part 21 of the bar parallel to the side wall 18 and two similar curved rods 27 equally spaced transversely from that plane. The rod 26 is made longer than either rod 27.

The spacing of the axles of the rollers 12 and 13, the compressibility of the roller material and the size of the part 22 are so chosen that the bar 19 is not drawn between the rollers at the entry end 22A when they are rotated in the direction shown.

The part 23 of the bar 19 is U-shaped in plan, the free ends of the legs of the U being provided with pins 23A each fitting into a socket in the end of the part 21 at 24. The joint at 24 is constructed to provide a smooth transition from the part 21 to the part 23.

Means (see also Fig. 3) are provided for varying the spacing of the axles of the rollers 12 and 13. These include a plate 28 welded to a side wall 18, a headed rod 29 screwed through the plate 28 and having its lower end in a block 30 which is slotted at 31 to slidably engage the walls of a slot 32 in the wall 18, and a pin 33 engaging a circumferential groove 29A in the lower end of the rod 29. The pin and groove connection permits rotation of the rod 29 within the block 30 but prevents axial displacement of the rod therein. By rotating the rod it is displaced axially through the plate 28 carrying with it the block 30. The latter has a hole 34 formed in it within which the adjacent end of the axle of the roller 12 is located.

A spring 35 is located on the rod 29 between the head 36 of the rod and the plate 28 (Fig. 3) to retain the block 30 in the position to which it is adjusted.

Similar means are provided at the other end of the roller 12 and at each end of the roller 16.

Alternative means for varying the spacing of the axles of rollers such as 12 and 13 may be provided.

A beater and scraper roller 38 is rotatably mounted with its axle 39 parallel to the axles of the other rollers. The ends of the axle 39 are journalled respectively at the ends 40 of plates 41 which are pivoted at their opposite ends 42 to side plates 18 by pivots 41A. A pin 43 secured to the side plate is located in a slot 44 in the plate 41 and adapted to secure the plates 41 and 18 together at any required position.

The roller 38 is polygonal in transverse section and rubber blades 38A are secured to the roller by plates 45 and screws 46. The edges 47 of the blades are parallel to the axle 39 and are located at equal distances therefrom slightly greater than the distance of the axle 39 above the upper surface of the bar 19.

Transverse pipes 48 are located at the corners of the machine frame and have passages 49 formed through them through which hot water or other suitable fluids are sprayed onto the rollers to remove fat and other material which collect on the rollers during use. Drip trays 50 leading to waste pipes are provided below the rollers.

Known means can be provided for driving the rollers in the direction shown by the arrows.

In use one end of a runner is manually located on the cage 20 with the latter within the inner membrane and is fed between the rollers 12 and 13.

With the rollers in motion the runner is then drawn forward continuously by the ridges of the roller 12 gripping the upper surface of the outer membrane and sliding it over the upper surface 21A of the bar 19 and by the ridges of the roller 13 gripping the lower surface of the outer membrane and sliding it over surfaces 51 (Fig. 6) of the part 21 of the bar. This movement is assisted by the sliminess of the membranes. At the same time the two membranes and the tissue 9 are crushed between the rollers and the bar 19.

The relative dimensions of the rod 26 and the rods 27 ensure that the fat 10 and the adjacent relatively weak part of the runner are located below and between the rods 27 and in the channel 25 where they are protected from the crushing action of the roller 13.

The rollers 14, 15 and 17 act similarly to the rollers 13 and the roller 16 acts similarly to the roller 12.

As the roller 38 rotates each of its blades first strikes the upper surface of the outer membrane to one side of a vertical plane through the axle and is then drawn along the upper surface in a scraping action which assists further the rupturing of the tissue 9 which is initiated by the roller 12.

The roller 16 continues the crushing action and the runner passes off the bar over the part 23.

It will be obvious that the various rollers may be employed in different combinations within the purview of the invention. However, the arrangement of rollers as shown has been found satisfactory.

It will be obvious also that more than one carrier bar may be employed with each machine. This will increase the capacity of the machine.

The complete separation of the membranes after the tissue 9 had been ruptured, may be carried out in various ways. For the manufacture of gut it is only essential that this separation should take place for part of the circumference of the runner adjacent to the point 11.

In one method, water or other suitable fluid is passed through the space between the membranes. In many cases this separates the membranes sufficiently but often separation occurs for only a very small part of the circumference of the runner and the water then passes through the passage so formed without further separating the membranes.

To ensure more nearly complete separation of the membranes, it has been found preferable to use a solid object, for example a polished steel ball which is located between the membranes adjacent to the point 11 and over which the runner is drawn.

Figure 7:
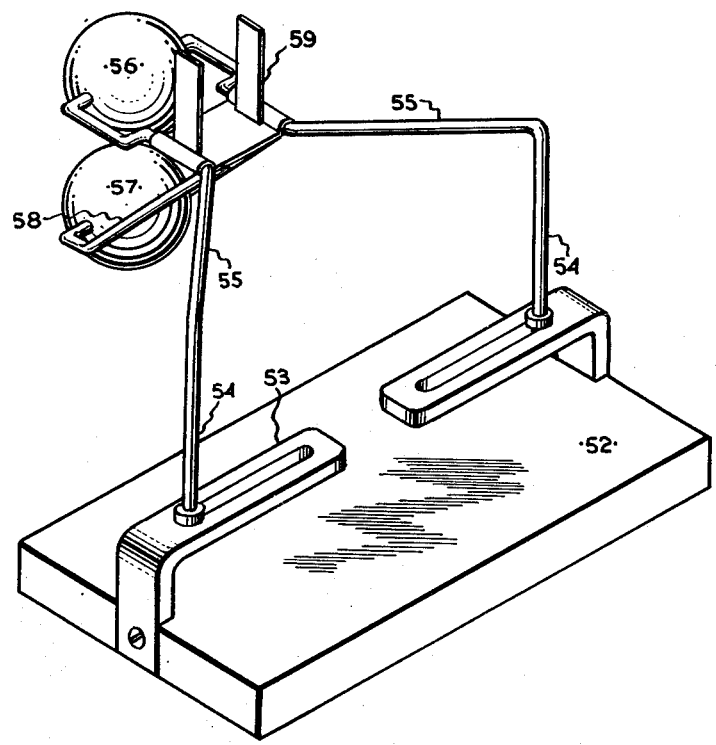
Fig. 7 is a perspective view of means for separating the membranes and splitting the outer one.

The device shown in Fig. 7 shows a convenient form of apparatus for carrying out the separation and the subsequent step of splitting or cutting the outer membrane along two approximately parallel lines adjacent to the point 11. Two balls are shown in use but one may be sufficient.

The device includes a base 52, slotted horizontal collinear arms 53 secured to the base and widely spaced legs 54 secured to the slotted arms. The respective legs 54 have horizontal arms 55 extending from them on which is pivotally mounted a polished steel ball 56. A similar ball 57 is pivotally mounted below and in contact with the ball 56 on sloping arms 58 secured to the arms 55. Spaced parallel cutting blades 59 are secured to the arms 55 forwardly of and adjacent to the upper ball 56.

The runner after passing through the crushing machine is pulled over the balls with the latter located between the inner and outer membranes and adjacent to the point 11 (see Fig. 8). As the runner passes the blades a strip is cut from the outer membrane and is drawn forwardly between the blades. The remainder of the runner is drawn forwardly below the ball 57 and between the legs 54 and is further treated to separate the uncut and unperforated inner membrane from the outer one and to render the inner membrane suitable for use as a sausage casing.

The cut away strip of the outer membrane is then further treated for use in the manufacture of gut.

The second ball 57 is not essential to the operation of the separating and cutting device but it assists the passage of the runner through the device. If the movement tends to slow down through the ball 56 not spinning under the inside surface of the outer membrane, the spinning of the ball 57 caused by its contact with the outer surface of the inner membrane will be transferred to the ball 56. It is unlikely that both balls will stop spinning simultaneously.

When the separation of the membranes is brought about by passing water through the space between them, the outer membrane may be split by any known type of splitting horn adapted to leave the inner membrane intact.

Separation of the membranes may also be carried out by passing both a liquid and a ball between the membranes simultaneously.

I claim:

1. A machine for treating runners, comprising a resilient entry feed roller, a second resilient feed roller spaced from the entry feed roller with their axes substantially parallel and in an approximately horizontal plane, a carrier bar supported on the feed rollers and adapted to receive a runner thereon with the bar located within the inner membrane, a third resilient roller located above the first feed roller and engaging the upper surface of the carrier bar, the carrier bar being formed with a thickened portion on the entry side of the entry rollers to prevent the bar from being drawn between the rollers, said carrier bar having a substantially flat upper surface and a channel formed underneath it, a beater and scraper roller located above the second feed roller and provided with circumferentially spaced resilient blades, each adapted as the beater and scraper roller rotates to beat and scrape against the carrier bar a runner fed along the bar, said rollers being rotatably mounted, said third resilient roller coacting with said upper surface of said carrier bar to rupture the connecting fibers between the inner and outer membranes of said runners by a crushing action whereas a portion of said runners are located in said channel and protected from a crushing action between said first feed roller and the underside of said carrier bar.

2. A machine as in claim 1, wherein at least one additional feed roller is located under and engages the carrier bar.

3. A machine as in claim 1, wherein at least one additional feed roller is located under and engages the carrier bar on the exit side of the beater and scraper roller, and an additional roller is located above each last-mentioned feed roller and engages the upper surface of the carrier bar.

4. A machine as in claim 1 including means for varying the pressure between the carrier bar and the rollers engaging its upper surface.

5. A machine as in claim 1 wherein the rollers have longitudinal ridges formed thereon.

6. A machine for treating runners comprising a carrier bar, rotatable means on two sides of said carrier bar for feeding the runner along said carrier bar arranged internally thereof, said carrier bar having a substantially flat upper surface and a channel formed underneath it, and roller means coacting with said carried bar for rupturing the fibers connecting the outer and inner membranes of said runner by crushing the runner against the flat upper surface thereof and said roller means, a portion of the runner being located in said channel and being protected from crushing action of said roller means.

7. A machine for treating runners comprising a runner carrier bar, rollers rotatably supported on two sides of said carrier bar, said carrier bar having a substantially flat upper surface and a channel formed underneath it, said carrier bar having a thickened portion at an end thereof for coaction with said rollers to prevent said bar from being completely drawn between said rollers, said rollers being resilient and peripherally corrugated, said rollers coacting with said carrier bar for rupturing fibers connecting the outer and inner membranes of a runner passed over said carrier bar by crushing the runner against said flat upper surface, a portion of the runner being located in said channel and being protected from crushing action of said rollers.

ALFRED HAROLD CASTELOW.

REFERENCES CITED

The following references are of record in the file of this patent:

UNITED STATES PATENTS

| Number | Name | Date |
|---|---|---|
| 482,600 | Trips | Sept. 13, 1892 |
| 846,406 | Duncker | Mar. 5, 1907 |
| 1,523,465 | Villemer | Jan. 20, 1925 |
| 1,723,714 | Stohrer | Aug. 6, 1929 |
| 1,745,564 | Waterman | Feb. 4, 1939 |

FOREIGN PATENTS

| Number | Country | Date |
|---|---|---|
| 281,399 | Germany | Jan. 6, 1915 |